(12) United States Patent
Bonnier et al.

(10) Patent No.: US 8,373,898 B2
(45) Date of Patent: Feb. 12, 2013

(54) METHOD, APPARATUS AND COMPUTER PROGRAM FOR TRANSFORMING DIGITAL COLOR IMAGES

(75) Inventors: Nicolas P. M. F. Bonnier, Paris (FR); Francis J. M. Schmitt, Paris (FR); Pamela Jeanette Schmitt, legal representative, Paris (FR)

(73) Assignee: OCE-Technologies B.V., Venlo (NL)

( * ) Notice: Subject to any disclaimer, the term of this patent is extended or adjusted under 35 U.S.C. 154(b) by 439 days.

(21) Appl. No.: 12/748,176

(22) Filed: Mar. 26, 2010

(65) Prior Publication Data

US 2010/0253954 A1 Oct. 7, 2010

Related U.S. Application Data

(63) Continuation of application No. PCT/EP2008/062910, filed on Sep. 26, 2008.

(30) Foreign Application Priority Data

Sep. 28, 2007 (EP) .................... 07117464
Sep. 9, 2008 (EP) .................... 08305538

(51) Int. Cl.
*H04N 1/60* (2006.01)
*G06K 9/00* (2006.01)
*G09G 5/02* (2006.01)
(52) U.S. Cl. ....... 358/1.9; 358/3.21; 358/3.27; 358/518; 358/519; 358/520; 382/167; 345/590
(58) Field of Classification Search .................. 358/1.9, 358/2.1, 3.21, 3.27, 447, 518, 519, 520; 345/590, 345/603, 604, 599; 382/162, 164, 167
See application file for complete search history.

(56) References Cited

U.S. PATENT DOCUMENTS

| | | | | |
|---|---|---|---|---|
| 4,825,297 A | * | 4/1989 | Fuchsberger et al. | 358/447 |
| 5,450,216 A | * | 9/1995 | Kasson | 358/518 |
| 6,954,287 B1 | * | 10/2005 | Balasubramanian et al. | 358/1.9 |
| 7,652,808 B2 | * | 1/2010 | Bala | 358/520 |
| 7,667,873 B2 | * | 2/2010 | Kang et al. | 358/1.9 |
| 8,050,496 B2 | * | 11/2011 | Pan et al. | 382/167 |
| 2003/0058464 A1 | * | 3/2003 | Loveridge et al. | 358/1.9 |
| 2005/0128496 A1 | * | 6/2005 | Bala | 358/1.9 |
| 2007/0211272 A1 | * | 9/2007 | Kang et al. | 358/1.9 |
| 2008/0166042 A1 | * | 7/2008 | Pan et al. | 382/164 |
| 2008/0166044 A1 | * | 7/2008 | Pan et al. | 382/167 |
| 2010/0272355 A1 | * | 10/2010 | Monga et al. | 382/167 |
| 2010/0302562 A1 | * | 12/2010 | Bonnier et al. | 358/1.9 |

OTHER PUBLICATIONS

Bonnier et al., "Spatial and Color Adaptive Gamut Mapping: A Mathematical Framework and Two New Algorithms", Ecole Nationale Superieure des Telecommunications, Department of Signal and Image Processing.

Durand et al., "Fast Bilateral Filtering for the Display of High-Dynamic-Range Images", ACM Transactions on Graphics, vol. 21, No. 3, Jul. 1, 2002, pp. 257-266, XP-002312495.

(Continued)

*Primary Examiner* — Kimberly A Williams
(74) *Attorney, Agent, or Firm* — Birch, Stewart, Kolasch & Birch, LLP

(57) ABSTRACT

A general framework for adaptive gamut mapping is presented in which the image is first decomposed in two bands, one containing the local means, the other the local variations. Two spatial and color adaptive gamut mapping algorithms are introduced. Based on spatial color bilateral filtering, they take into account the color properties of the neighborhood of each pixel. Their goal is to preserve both the color values of the pixels and their relations between neighbors.

9 Claims, 10 Drawing Sheets

OTHER PUBLICATIONS

Durand et al., Fast Bilateral Filitering for the Display of High-Dynamic-Range Images, Interet Citation, Jul. 3, 2002, XP-002472413.
Farup et al., "A Multiscale Framework for Spatial Gamut Mapping", IEEE Transactions on Image Processing, vol. 16, No. 10 Oct. 1, 2007, pp. 2423-2435, XP-011192104.
Meyer et al., Color Gamut Matching for Hard Copy, SID International Symposium, May 16, 1989, vol. 20, pp. 86-89, XP-000076842.
Skarbez., Color and High Dynamic Range (HDR) Imaging Internet Citation, Nov. 11, 2007, XP-002472412.
Tomasi et al. "Bilateral Filtering for Gray and Color Images", 6th International Conference on Computer Vison. ICCV '98, Jan. 4-7, 1998, pp. 839-846, XP-000926378.
Zolliker et al., "Adding local contrast to global gamut mapping algorithms", Final Programme and Proceedings. CGIV. European Conference Oncolour in Graphics, Imaging and Vision, XX, XX, vol. 1, Jun. 19, 2006, pp. 257-261, XP-008089353.

* cited by examiner

METHOD, APPARATUS AND COMPUTER PROGRAM FOR TRANSFORMING DIGITAL COLOR IMAGES

CROSS-REFERENCE TO RELATED APPLICATIONS

This application is a Continuation of PCT International Application No. PCT/EP2008/062910 filed on Sep. 26, 2008, which claims the benefit of Patent Application Nos. 07117464.3 and 08305538.4 filed in Europe, on Sep. 28, 2007 and Sep. 9, 2008 respectively. The entire contents of all of the above applications are hereby incorporated by reference.

BACKGROUND OF THE INVENTION

1. Field of the Invention

The invention relates to a method for mapping an original image from a source gamut color subspace to a destination gamut color subspace including first filtering the original image to obtain a first intermediate image; gamut mapping the first intermediate image to obtain a second intermediate image; second filtering the first intermediate image to obtain a third intermediate image; and merging the second intermediate image and the third intermediate image to obtain a target image. The invention also relates to an image display system and a color image printing system adapted to implement the method.

2. Description of Background Art

Gamut Mapping Algorithms (GMA's) are used to manage the color gamut changes between an original image and its reproduction via a given technology like printing, photographic imaging, electronic displaying, etc. These changes correspond to shape differences and size reduction of the gamut causing a loss of information. Ideally, a GMA should optimize the reproduction by taking into account the color and spatial distribution of the original image, such that the reproduction is perceived as similar as possible to the original. In the quest for an optimal reproduction, an impressive number of GMAs have been proposed in the literature. In "The fundamentals of gamut mapping: A survey" of J. Morovic and R. Luo an exhaustive survey has been presented. The ICC color management flow is based on the first generation, non-adaptive point-wise GMAs. Morovic classified these classic GMAs into two categories: gamut clipping and gamut compression. Gamut clipping algorithms project color lying outside the output gamut into its boundary. They usually preserve saturation, but clip image details, and introduce clipping artefacts. Gamut compression algorithms compress the input gamut onto the output gamut and are better at preserving details but tend to reduce saturation.

In "Digital Colour Imaging Handbook, Chapter 10: Gamut Mapping" of J. Morovic, adaptive algorithms with the selection of an appropriate GMA depending on the image type or directly on the image gamut instead of the input device gamut have been investigated. To further improve adaptive GMAs, it has been advocated that preservation of the spatial details in an image is a very important issue for perceptual quality. GMAs adaptive to the spatial content of the image, i.e. Spatial Gamut Mapping Algorithms (SGMAs), have been introduced. These algorithms try to balance both color accuracy and preservation of details, by acting locally to generate a reproduction perceived as close to the original. Two families of SGMAs which follow different approaches may be distinguished: the first uses iterative optimization tools, the second reinserts high-frequency content in clipped images to compensate for the loss of details caused by clipping. The optimization family includes algorithms proposed in "Colour gamut mapping based on a perceptual image difference measure" by Nakauchi et al. Using models of perception of the Human Visual System (HVS), the algorithms minimize the perceived differences between the original and the candidate reproduction by locally modifying the candidate. In these optimization loops, the main difficulty is to define an appropriate criterion to optimize, using a valid perceptual model. Another problem is the lengthy computing time, making these algorithms difficult to use in an industrial context. Algorithms of the second family are usually sufficiently fast to be implemented in an industrial color flow. They have a less ambitious motivation: to limit or compensate for the loss of details caused by clipping algorithms. Clipping yields good results in terms of saturation but tend to degrade image details in saturated areas. The projection might fail because it projects all non reproducible colors lying on the line of the projecting direction onto the same point on the gamut boundary. If in a local area, several neighboring pixels lie on the same line of projection but with distinguishable colors, the local variations that form the spatial content will be erased. Similarly, if pixels in a local neighborhood lie on nearby projection lines, they will be mapped to nearby points on the gamut hull, and the local spatial variations may be severely diminished. To prevent these degradations, for this second family of SGMAs improvements have already been proposed in the art. These improvements proposed so far can be divided in two groups.

In the first group (XSGM), as disclosed in "Gamut mapping to preserve spatial luminance variations" by Balasubramanian et al., the original image is gamut mapped using a direction of projection that emphasises preservation of chroma over luminance. The parts of the original image that were clipped are high pass filtered and added to the gamut mapped image. The resulting sum is again gamut mapped using a direction of projection that emphasises preservation of luminance over chroma. Previously conducted psychophysical evaluations showed that this method obtains good scores but suffers from the presence of halos.

In the second group, as disclosed i.e. in "A multi-resolution, full color spatial gamut mapping algorithm" by Morovic and Wang, it is proposed to first decompose the image in frequency bands. The low pass band is gamut mapped then successive clippings are performed during the reconstruction. Results of such an approach depend both on the algorithm used in the image decomposition and on the GMAs successively applied.

In both groups, problems may arise when adding high pass content to the gamut mapped image: artefacts such as halos and color shifts might be introduced.

In order to further mitigate the problems of the prior art an improved Gamut Mapping Algorithm is proposed.

SUMMARY OF THE INVENTION

The inventors have recognized that optimal GMA's first need to fully preserve hue, then preserve lightness and chroma as much as possible; second need to preserve spatial information: the color relations between neighboring pixels must be preserved, as does the balance between the frequency bands; and third need to avoid the introduction of artefacts such as halos, hue shift or posterization.

Based on this recognition, according to a first aspect of the invention, the method according to the preamble is improved in that the merging step comprises merging the second intermediate image and the third intermediate image while preserving the color and spatially contents of the first image by moving pixels in the output gamut, based on a criterion. In this way, a framework for adaptive mapping is realized with a locally adaptive spatial gamut mapping algorithm, which offers a nice compromise between the preservation of the color values and the preservation of the color relation between neighboring pixels, whereas in the prior art mere summation is used.

Criteria applied are based on measures of local similarity between the original image and the reproduction. Various methods can be applied here to measure the similarity between the results of an image quality metric applied to the two images. Criteria applied are further worked out in a first and second embodiment. The effect is to ensure locally the preservation of the local image characteristics.

Also based on the recognition given above, according to a second aspect of the invention, the method according the preamble is improved in that the first filtering step comprises using a bilateral filter for blurring smoothly changing regions of the original image with preservation of strong edges.

Bilateral Filters are known in the art, but not on this place in a transformation flow. In similar flows in the prior art a Gaussian filter is used. In this way edges are preserved in the image decomposition, leading to the absence of halos in the later constructed image. Without the bilateral filtering, if the original image contains sharp transitions (edges) halos might appear in the output image.

In a first embodiment according to the first aspect the merging step comprises adaptive compression in order to fit all pixels in the gamut while preserving relationships between neighboring pixels. This leads to preserving the relationships between neighboring pixels and therewith allowing a faithful reproduction of the original image, the main goal of a gamut mapping algorithm.

In a second embodiment according to the first aspect the merging step comprises mapping pixels lying outside the gamut to the gamut boundary. This leads to preserving the relationships between neighboring pixels and preserving the color component of each pixel are the two goals of the gamut mapping algorithm. In this embodiment, the result is on the gamut hull, thus the color saturation is very high leading to a faithful reproduction of the original image both in term of local energy and saturation. The criterion is the similarity in local Energy between the 2 images.

In yet a next another embodiment the second filtering step comprises the step of determining the difference between the original image and the first intermediate image in order to preserve high frequencies in the smoothly changing regions.

In a next embodiment the first filtering step comprises using a bilateral filter for blurring smoothly changing regions of the original image with preservation of strong edges.

This allows the separation of the details in the image that are most likely to be damaged by a classic clipping and allows taking good care of them in a later stage.

In another embodiment, the input image is decomposed in a multiscale manner. After the merging step for a first time, the merging step is repeated by merging the output of the previous merging step and a next high pass image. This allows a multiscale approach similar to the one of the human visual system.

The notion of image that is used in the appropriate cases refers to a set of pixels having values, where each value of a pixel has a value from a color subspace.

Regarding the notation of variables used in this application the following is remarked:
$I_{\overline{low}}$ is also indicated as IlowM;
$I_{\overline{high}}$ is also indicated as IhighM;
in general the horizontal bar above a subscript corresponds with an extension of "M" indicating that the variable has been mapped;
L, C, h are also indicated with a star *; and
for variables the subscripts and superscripts are in cases indicated as normal characters following the main character of the variable: e.g. Ilow is identical to $I_{low}$.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE EMBODIMENTS

Framework

Figure 1:
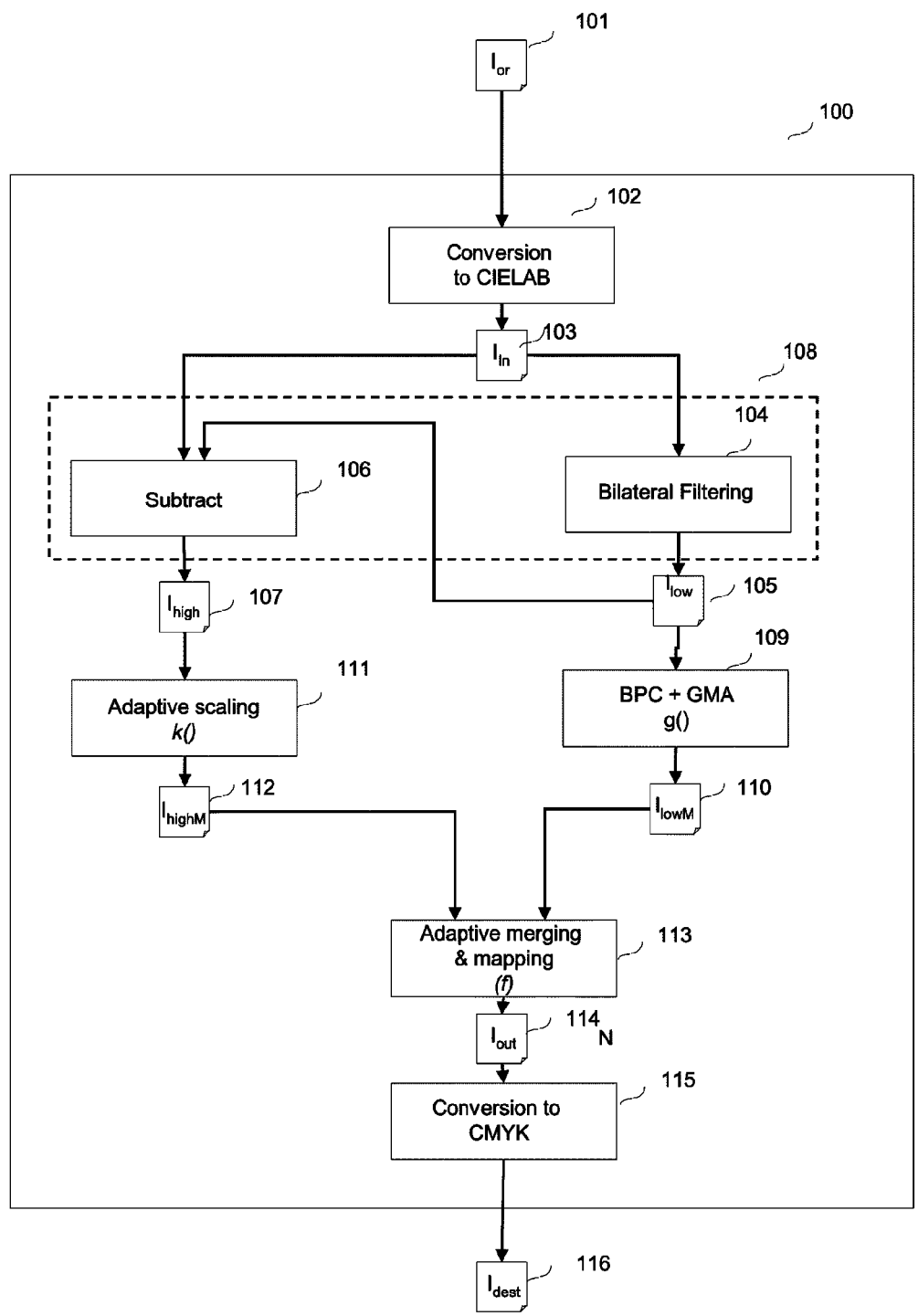
FIG. 1 shows a system for gamut mapping according to the invention.
Figure 2:
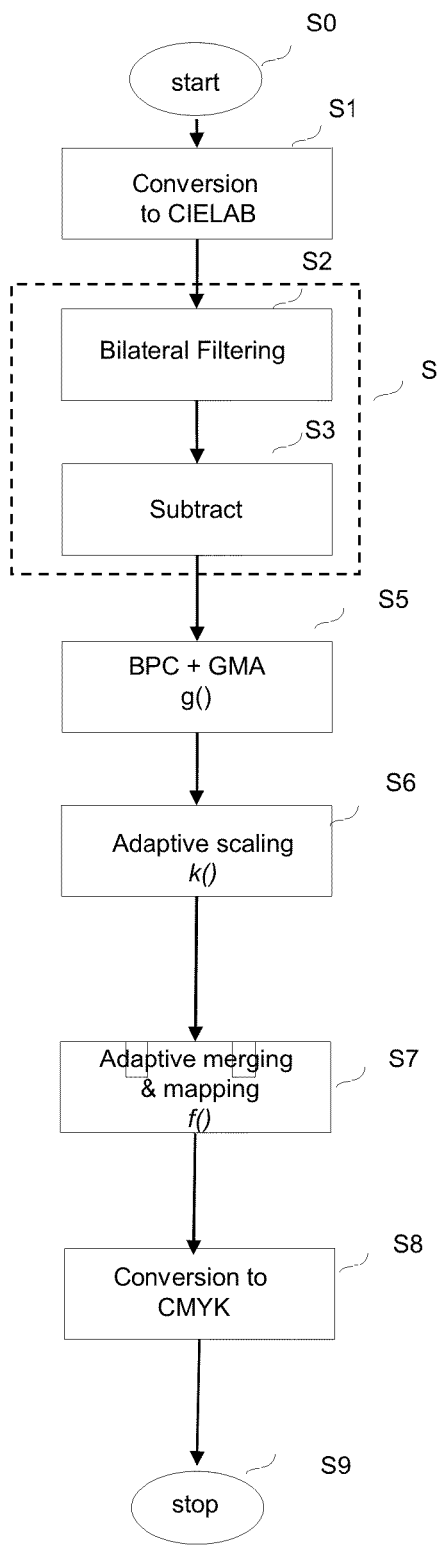
FIG. 2 shows a flow diagram representing an embodiment of a method according to the invention.

FIG. 1 illustrates a system 100 comprising a number of components making up a framework for adaptive gamut mapping according to the invention. In the framework images going from one component to another are indicated as a rectangulars with a folded corner. The components, also referred to as modules, may be embodied as software components running under a certain operating system on a computer or they may be embodied in hardware as dedicated circuits like FPGLA's or the like. FIG. 2 provides a flow diagram representing an embodiment of a method according to the invention. Both diagrams are related in the sense that typically a particular component carries out a particular step of the method.

In step S1, executed by component 102, an original image $I_{or}$ (101) is converted to CIELAB color space, using the absolute intent of the input ICC profile and yielding $I_{in}$ (103).

In a next step S2, executed by component 104, a low pass band $I_{low}$ (105) is obtained from $I_{in}$ by Bilateral Filtering. In this step a weighted local mean is computed where each neighbor is given a weight, which is a function of both the geometric distance and the colorimetric $\Delta E_{ab}$ distance to the central pixel. This mean is computed using a five-dimensional bilateral filtering algorithm. The resulting low pass band $I_{low}$ (105) contains these weighted local means, where the weight is a function of both the geometric distance and the colorometric $\Delta E_{ab}$ distance to the central pixel.

In step S3, executed by component 106, the high pass band $I_{high}$ (107), comprising the local variations, is determined by taking the difference of $I_{in}$ and $I_{low}$.

Step S2 and S3 together, indicated as S4 and corresponding with modules 104 and 106, together indicated as 108, effectively decompose the image in several bands. In the embodiment illustrated so far the image is decomposed in two bands, one containing the local means, the other the local variations.

In a next step S5, corresponding with module 109, $I_{low}$ is mapped on the destination gamut DestGamut by clipping and Black Point Compensation is applied. This transformation will further be indicated by g( ). Note that degradation by clipping mostly occurs in a neighborhood in which several pixels have nearby color values. However the previous bilateral filtering in step S2 will prevent this: such a neighborhood will be blurred by the filter and the local variations will be safely preserved in $I_{high}$. This step provides as output $I_{lowM}$ (110).

In step S6, corresponding with module 111, a transformation k( ) is carried out on $I_{high}$ resulting in $I_{highM}$ (112).

In step S7, corresponding with module 113, a spatial and color adaptive gamut mapping algorithm is applied, further indicated as f( ). Due to the bilateral filtering carried out in step S2, the neighborhood of each pixel is taken into account in such a way that the color values of the pixels and their relations between neighbours are preserved. This yields $I_{out}$ (114).

Finally in step S8, corresponding with module 115, $I_{out}$ is converted to the CMYK encoding of the output printer using the relative colorimetric intent of its associated ICC profile. This yields $I_{dest}$ (116).

The application of this framework in a printing system will be discussed later. The framework according to the invention will now be elaborated in more detail.

Color Space

In step S1 conversion to CIELAB is executed. It is noted that the color space in which a Spatial Gamut Mapping Algorithm is applied is of importance. In the embodiment presented CIELAB is chosen, however also CIEXYZ will be used.

Image Decomposition

The goal of the decomposition, carried out in module 108, is to set apart the local means and the local details of the image in order to process them separately and preserve both as much as possible in the resulting image. The framework presented decomposes the image in two bands, however by modification of module 108 the framework will be suited for n bands. The improvements in BPC and SCAGMAs are also suited to be applied with several bands.

Low Pass Filtering

Using Gaussian Filters for low pass filtering will result in halos. To avoid the introduction of halos, the decomposition is obtained by an edge preserving filter using 5D Bilateral Filtering (BF). The size of the filter is a crucial parameter and it will be discussed shortly. The number of frequency bands in the decomposition under consideration is 2, but may be more and a maximum will only be constrained by the cost of the computation time.

5D Bilateral Filtering (BF) in the CIELAB space is a combined spatial domain and color range filtering. Let $L_{BF}$=BF(L), $a_{BF}$=BF(a), $b_{BF}$=BF(b) denote the three channels of the filtered image. The $L_{BF}$ value of pixel i, $L^i_{BF}$, can be obtained as follows (similar expressions for $a^i_{BF}$ et $b^i_{BF}$):

$$L^{*i}_{BF} = \sum_{j \in I_{in}} w^j_{BF} L^{*j},$$

$$w^j_{BF} = \frac{d(x^i, x^j) r(p^i, p^j)}{\sum_{j \in I_{in}} d(x^i, x^j) r(p^i, p^j)},$$

where $I_{in}$ is the original image, $d(x^i, x^j)$ measures the geometric closeness between the locations $x^i$ of pixel i and $x^j$ of a nearby pixel j. $r(p^i, p^j)$ measures the colorimetric similarity between the colors ($L^i$, $a^i$, $b^i$) and ($L^j$, $a^j$, $b^j$) of pixels i and j.

In our implementation, $d(x^i, x^j)$ and $r(p^i, p^j)$ are gaussian functions of the Euclidean distance between their arguments:

$$d(x^i, x^j) = e^{-\frac{1}{2}\left(\frac{\|x^i - x^j\|}{\sigma_d}\right)^2},$$

$$r(p^i, p^j) = e^{-\frac{1}{2}\left(\frac{\Delta E^*_{ab}(p^i, p^j)}{\sigma_r}\right)^2},$$

where the two scale parameters $\sigma_d$ and $\sigma_r$ play an essential role in the behavior of the filter. These will be discussed shortly. It is noted that equally parameters $\delta_d$ or $\delta_r$ may be used for characterization of the filter.

Figure 3:
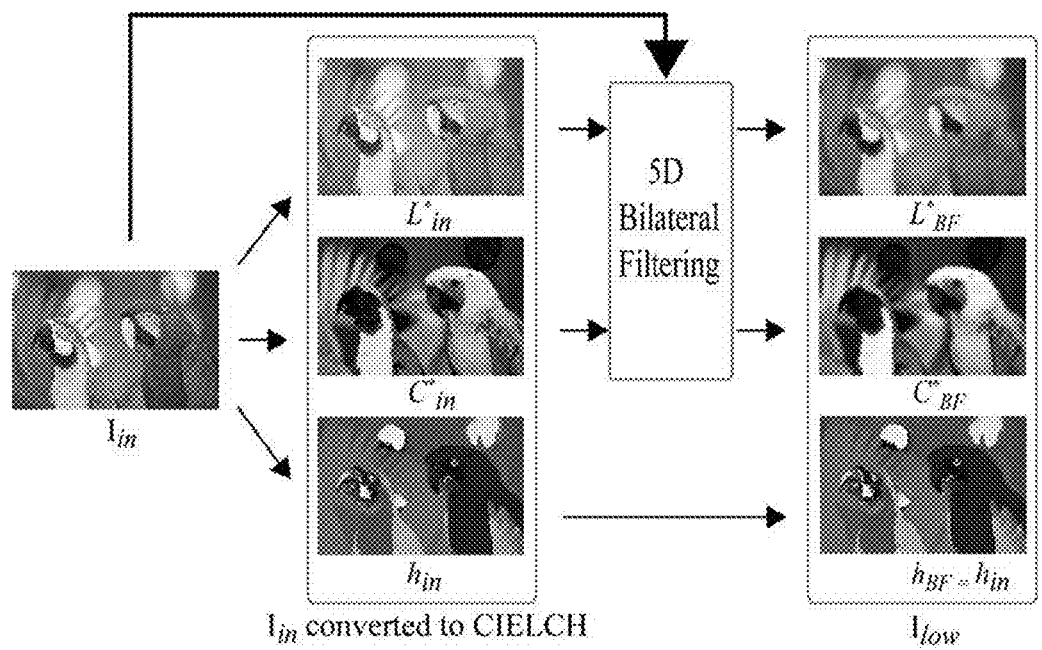
FIG. 3 shows a further elaboration of the step for bilateral filtering.

For the decomposition in two bands according to the invention, first, the original CIELAB image is converted to the polar representation CIELCH, i.e. lightness, chroma and hue. To compute the low-pass band $I_{low}$ only the two channels $L_{in}$ and $C_{in}$ of the original image $I_{in}$ are filtered using 5D bilateral filtering. This is illustrated in FIG. 3. The $h_{in}$ channel is not filtered, to keep the hue unaltered by the proposed SGMA. Nevertheless, since the 5D bilateral filter involves $\Delta E_{ab}$ distance, the hue will be well taken into account in the filtering of $L_{in}$ and $c_{in}$ channels.

The low pass band $I_{low}$ is thus defined as:

$$I_{low} = (L_{BF}, c_{BF}, h_{in})$$

where $L_{BF}$=BF($L_{in}$) and $c_{BF}$=BF($c_{in}$).

Filter Parameters, Spatial Filter Size

In classic gaussian filtering, the width of the gaussian filter (set by $\sigma_d$) determines the boundary between the lower frequency content going to the low-pass band (considered as local means) and the higher frequency content going to the high-pass band (local details). Setting the appropriate value for $\sigma_d$ is not a trivial task. This choice relates to the definition of 'local details' (i.e. small or minor elements in a particular area). This definition depends on multiple parameters such as the size and resolution of the reproduction, the modulation transfer function of the reproduction device, the viewing conditions, the distance of visualization and the behavior of the human visual system. It is known in the art to model the human visual system by multi-scale decompositions with more than two bands (usually up to five). By applying this now in the framework according to the invention it allows for the definition of several categories of details with different sizes. For the embodiment presented, the image decomposition is limited to two bands. Appropriate values for $\sigma_d$ and $\sigma_r$ for this embodiment will be discussed now.

Filter Sizes in 5D Bilateral Filter

In the 5D bilateral filter the $\Delta E_{ab}$ color distance between the central pixel and nearby pixels is also taken into account. This allows us to avoid halos and to handle specifically the local transitions between local similar pixels. Nearby pixels at small $\Delta E_{ab}$ distance (i.e. perceived as similar) are filtered. Pixels are less and less filtered as the $\Delta E_{ab}$ distance be-comes large compared to $\sigma_r$. Thus $\sigma_r$ determines a reference to set apart small $\Delta E_{ab}$ from large $\Delta E_{ab}$. While small $\Delta E_{ab}$ values are well correlated with perceived color differences, it is more difficult to define a threshold $\sigma_r$ above which $\Delta E_{ab}$ values can be considered as large. One goal of the SCAGMAs is to preserve color differences that would otherwise be mapped by gamut mapping algorithms to the same color of the destination gamut. Thus to set $\sigma_r$, the average distance between the input and destination gamuts might be considered. The ability of the output device to maintain small differences between colors could also be taken into account.

Given the lack of a straightforward definition for 'local details' and 'similar colors', we propose to review the previous work and to evaluate the impact of $\sigma d$ and $\sigma r$ values on the image decomposition.

Experiments carried out by the inventor brought forward the following observations: A larger value of $\sigma d$ means a broader filter in the image domain, thus a larger set of frequencies being filtered. Indeed considering a column of images with increasing $\sigma d$ going from top to bottom, when browsing the images from top to bottom, one observes that $I_{low}$ becomes blurrier and $I_{high}$ presents more and more details. A larger value of $\sigma_r$ means a larger filter in the color domain, thus a larger range of color transitions being filtered. When $\sigma_r$ is very large, the bilateral filter is not modulated by the color content of the filtered area and the resulting blurring of the image becomes similar to the blurring of a two dimensional gaussian filter. It also leads to the introduction of halos near the strong edges. Viewing a row of images with an increasing $\sigma_r$, one finds more and more color content in $I_{high}$.

We now consider the relation between $\sigma_d$ and $\sigma_r$. A small value of $\sigma_r$ severely limits the blurring of the image to very small color transitions for any $\sigma_d$. A small value of $\sigma_d$ limits the blurring of the image to high frequency content for any $\sigma_r$. When both $\sigma_d$ and $\sigma_r$ have very large values, $I_{low}$ shows some color shifts due to a large boost of chroma in desaturated areas surrounded by saturated areas. These would cause trouble in the gamut mapping process, yet it only occurs for very large $\sigma$ values.

Based on our observations, we find the values $\sigma_r$=20 $\Delta E_{ab}$ and $\sigma_d$=20 pixels (i.e. approximately 1.5% of the diagonal) to be a good compromise which suits these algorithms and a set of appropriate images.

Considering $\delta_d$ and $\delta_r$ as parameters, it is stated that the setting of $\delta_d$ should depend on the image size and the conditions of visualisation. In earlier experiments, we have set the values to $\delta_d$=1% of the image diagonal and $\delta_r$=25$\Delta E$ (for images printed at 150 dpi, at the size 9 cm-15 cm by 12 cm-20 cm, viewed at a distance of 60 cm).

In a particular embodiment these parameters, discussed above, may be set by a user via a user interface, or by a control program based on status and settings of the job and the system.

High Pass Filtering

The high pass band $I_{high}$ is then calculated in step S3, executed by module 106 in FIG. 1, by taking the difference of $I_{in}$ and the low pass $I_{low}$:

$$I_{high}=I_{in}-I_{low}=(L_{in}-L_{BF},c_{in}-c_{BF},0)$$

Figure 4:
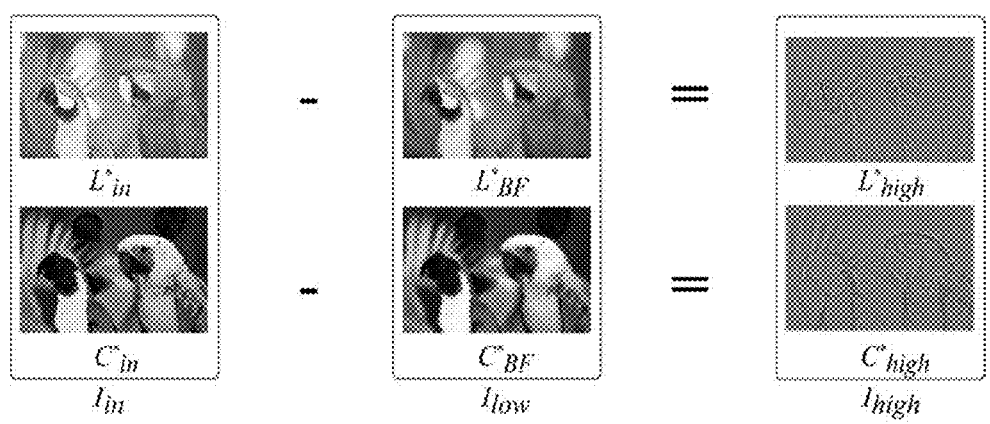
FIG. 4 illustrates calculation of $I_{high}$.

This is illustrated in FIG. 4.

Function g( ) Applied to the Low Pass Band.

The step of applying Function g( ) to the low pass band (step S5, executed by module 109) will now be further elaborated.

Function g( ) acts on the local means of the input image $L_{in}$ contained in $L_{low}$. Its goal is to map the gamut of $L_{low}$ into the destination gamut Gamut$_{Destination}$, while preserving as much as possible the color attributes such as hue, lightness and chroma. It also needs to preserve global rendering.

In order to avoid consequent clipping of low-key values in the image Black Point Compensation (BPC) is applied on $I_{low}$.

In the following section an algorithm for inclusion in the framework and method according to the invention is proposed.

Figure 5:
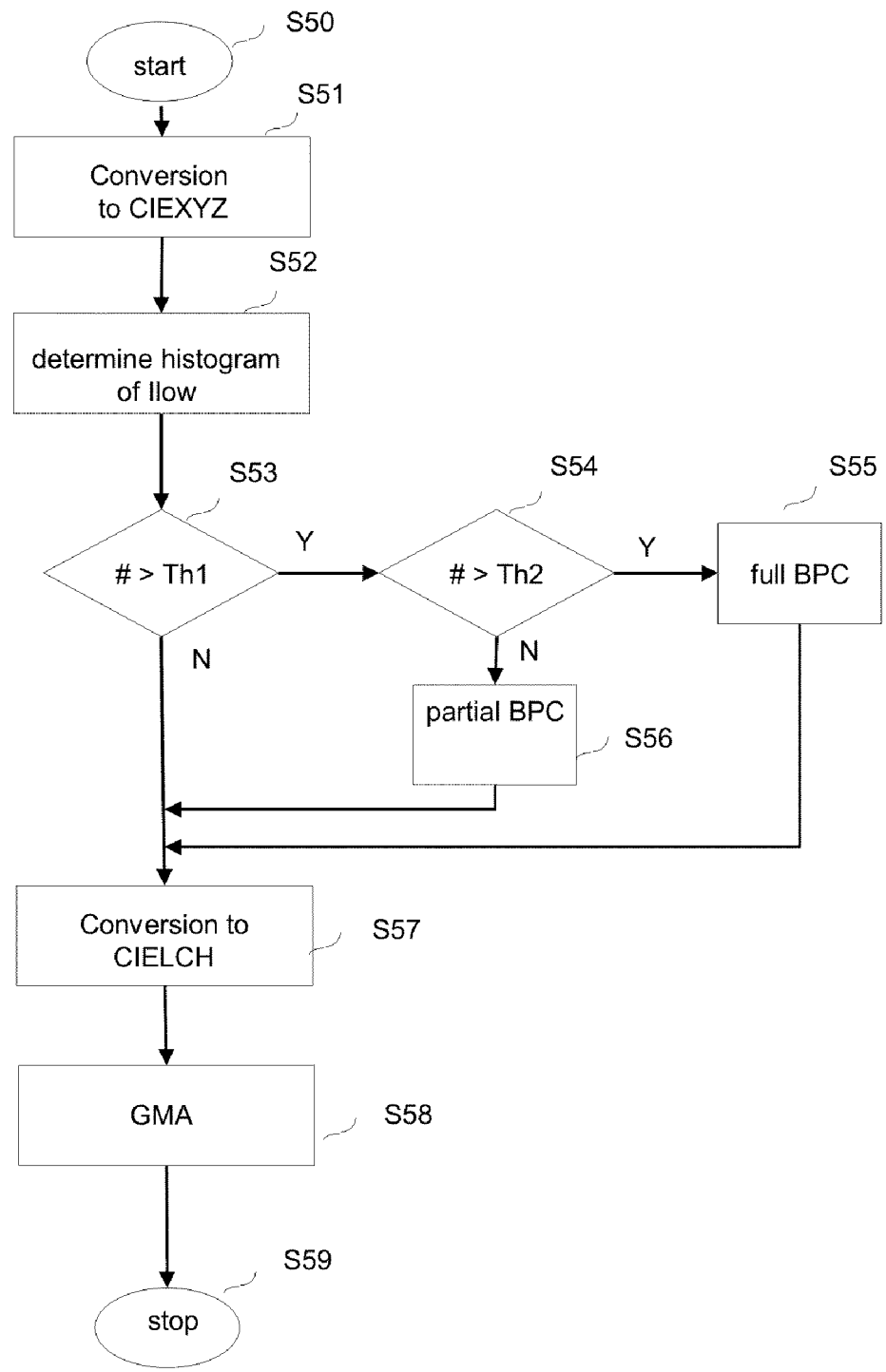
FIG. 5 shows a flow diagram for adaptive BPC.

Black Point Compensation (BPC) also referred to as linear XYZ scaling maps the source's black point to the destination's black point in the CIEXYZ color space, hence scaling intermediate color values. It is noted that Black Point Compensation can be considered as a gamut compression algorithm. As such, it produces images that are less saturated. This desaturation is not always welcomed and/or necessary. The method proposed overcomes this disadvantage. The method for BPC will be explained now with reference to FIG. 5. FIG. 5 is an elaboration of step S5 in FIG. 2. In a first step S51 $I_{low}$ is converted to a normalized flat XYZ encoding with white point=[1,1,1]. In the next step S52 a histogram of $I_{low}$ is made up. Along the x-axis of the histogram the Y-values of $I_{low}$ run. Along the y-axis of the histogram the number of pixels having a given Y-value are indicated. On the horizontal axis also the minimum Y value of the Destination device Y$_{minDest}$ is indicated. From the histogram the total number of pixels, #, with a Y value below Y$_{minDest}$ is determined. Is this number above a first threshold Th1 (step S53, Y), in the next step S54 it is checked if this number is also above a second threshold Th2, where Th2>Th1. If so (step 54, Y) full black point compensation will be carried out (step S55).

For full BPC the Y$_{lowBPC}$ value of pixel i, Y$^i_{lowBPC}$, is obtained as follows (similar expressions for X$^i_{lowBPC}$ and Z$^i_{lowBPC}$):

$$Y^i_{lowBPC} = \frac{Y^i_{low} - Y_{minlow}}{1 - Y_{minlow}}(1 - Y_{minDest}) + Y_{minDest},$$

where Y$^i_{lowBPC}$ is the scaled Y value of the destination pixel i, Y$^i_{low}$ the Y value of the source pixel i, Y$_{minlow}$ the minimum Y value of the image and Y$_{minDest}$ the minimum Y value of the destination device.

If in step S54 it turns out that #>Th2 does not hold (N), partial BPC is carried out (step S56), where partial BPC is a linear combination between no BPC and full BPC, according to the next equation:

$$I_{lowBPCadaptive}=q*I_{low}+(1-q)*I_{lowBPC}$$

where q=#/(Th2−Th1).

In case in step S53 it turns out #>Th1 does not hold (N), meaning that only the color of a few pixels or less is below the black point of the output device, BPC is not necessary at all and will not be carried out. Thresholds Th1 and Th2 are parameters that can be set by an operator via a user interface on an apparatus.

The method will continue with S57, as also will happen after carrying out step S56 and after carrying out step S55, wherein the image resulting is converted to CIELCH.

After this conversion the method continues with step S58 where the low pass band obtained is further processed.

BPC significantly decrease the number of out of gamut pixels and the distance between the gamut and these pixels. Since the BPC in CIE XYZ scales down the gamut of $I_{low}$, boundaries of $I_{lowBPC}$'s gamut are closer to the destination gamut and the choice of initial clipping has less impact on the final results. In previous experiments some colorful images clipping artifacts were noticeable. These artefacts were due to the initial clipping using HPMinΔEab. However such artifacts are no longer an issue when applying the black point compensation first, and HPMinΔEab is appropriate to preserve the saturation: $I_{low}$=HPMin HPMinΔE($l_{lowBPC}$).

The second step of function g( ) is the gamut mapping of the low-pass band. The goal of this mapping is to preserve as much as possible the color of each pixel in $I_{low}$. Preserving the color distance between neighbors is not as critical as when mapping the whole $I_{in}$, since most of the important details of the decomposed image have been filtered by the 5D bilateral filter and lie in $I_{high}$. These constraints lead to the use of HPMinΔE after BPC resulting in the clipped image $I_{lowM}$ where:

$$I_{lowM}=HPMin\Delta E(IlowBPC)=g(I_{low}),$$

$$g=HPMin\Delta E \cdot BPC.$$

Note that the hue channel is left unaltered by HPMinΔE: $h_{lowM}=h_{low}=h_{in}$. Since the BPC in CIE XYZ scales down the gamut of $h_{low}$, boundaries of the gamut of $I_{lowBPC}$ are closer to the destination gamut and the choice of initial clipping has less impact on the final results. The choice of HPMinΔEab for gamut mapping is appropriate since it preserves the saturation and maintains the hue constant.

However in another embodiment (SCACOMP version) of our spatial and color adaptive GMA (see below function f( ), HPMinΔEab is substituted by another clipping algorithm SCLIP clipping toward the 50% grey point in order to apply consistent locally adaptive compression that would not be consistent if using HPMinΔEab:

$$I_{lowM}=SCLIP(I_{lowBPC})=g(I_{low}),$$

$$g=SCLIP \cdot BPC.$$

Function k( ) Applied to the High-Pass Band

The step of adaptive scaling, step S6 of FIG. 2, executed by module 111 of FIG. 1, will now be worked out further. When image areas of $I_{low}$ have been greatly modified into $I_{lowM}$ by the clipping, the local energy within $I_{lowM}$ may substantially be reduced compared to the local energy within $I_{low}$. In the image areas where both $I_{low}$ and $I_{high}$ have large local energies but $I_{lowM}$ has lost a part of its local energy, it might be wise to reduce the energy of $I_{high}$ to form $I_{highM}$ to maintain a balanced ratio between the contributions from the two bands $I_{lowM}$ and $I_{highM}$, similar to the ratio between $I_{low}$ and $I_{high}$. Therefore we introduce a(i, $I_{low}$, $I_{lowM}$) a local variable affecting the amount of Ihigh being added to $I_{lowM}$ during the merging at each pixel i:

$$I_{highM} = \alpha \cdot I_{high}, \text{ or equivalently:}$$

$$p^i_{\overline{high}} = \alpha^i \cdot p^i_{high},$$

$$\alpha^i = \min\left(\sum_{j \in I_{in}} w^j_{BF} \frac{\|p^j_{\overline{low}} - p^i_{\overline{low}}\| + \epsilon}{\|p^j_{low} - p^i_{low}\| + \epsilon}, 1\right),$$

where ε is a small constant value to avoid dividing by zero if $p^j_{low}=p^i_{low}$ and $w^i_{BF}$ are the weights of the bilateral filter used in the decomposition of the image. Preferably ε=0.001.max (|plow|). α is taken into account in the modified versions of SCACOMP and SCACLIP. Notice that a is less critical when Black Point Compensation is applied to $I_{low}$ as the local structure of the low-pass band is then better preserved and α is often close to 1.

In a particular situation α=1 and $I_{high}=I_{highM}$.

Adaptive Merging and Mapping of the Two Bands, Function f( )

The two bands $I_{low}$ and $I_{high}$ have been modified by g( ) and k( ) respectively, and at this point, $I_{lowM}$ and $I_{highM}$ can be merged and then mapped (step S7 and module 113).

In this step, the mapped low pass image $I_{lowM}$ and the high pass band image $I_{highM}$ are merged.

The merging operator is an addition, as simple as the decomposition operator:

$$I_{temp}=I_{lowM}+I_{highM}.$$

Although more elaborated merging is also possible, since function k performs as a locally dependent weight similar to that of an adaptive merging a simple addition for merging suffices for the framework presented.

Since colors in $I_{temp}$ might lie outside the destination gamut Gamut$_{Dest}$, a second gamut mapping is necessary. Unlike the mapping of $I_{low}$, this mapping needs to preserve details and should therefore adapt to the content of $I_{temp}$.

The bilateral filter (module 104, step S2) filters low color variations and maintains high color variations (i.e. strong edges). According to these properties, local spatial variations contained by $I_{highM}$ present only low color variations. Therefore, each pixel and its neighbors are more likely to be projected to a same little area of the gamut boundary if f( ) is a clipping GMA. This would result in a strong diminution of the variations present in $I_{high}$. To avoid this situation, f( ) and also k( ) may be locally adaptive functions with the following objectives for a pixel $p_{out}$ of the resulting image $I_{out}$:

$p_{out}$ is as close as possible to $p_{in}$ of $I_{in}$, the color variations of $p_{out}$ with its neighbors are the closest to the color variations of $p_{in}$ with its neighbors, $p_{out} \in$ Gamut$_{Dest} \cap \phi$ (plane of constant hue $h_{in}$ of $p_{in}$).

Since the first two requirements might be antagonistic, $p_{out}$ results of a compromise. A weighted sum can be used here:

$$\begin{cases} p_{out} \in (Gamut_{Dest} \cap \varphi), \\ p_{out} = \underset{p}{\operatorname{argmin}}[w\Delta_1(p, p_{in}) + (1-w)\Delta_2(p_{high}, p_{\overline{high}})], \end{cases}$$

where w∈[0, 1] is a weight and Δ1, Δ2 are distance metrics (several metrics are available in this context).

If w=1, k becomes minimum O1 clipping (k=HPMinΔE if Δ=ΔE*ab).

If w=0, only the color variations between the pixel and its neighbors will be preserved, not the pixel value.

In intermediate cases w∈]0, 1[, the result might be obtained by an optimization algorithm.

Fast solutions can be deployed to maintain the computational time at a reasonable level. A tradeoff of computation time versus quality of the result has to be taken into account. In the next sections, two alternative and fast embodiments are proposed that provide approximations of the best obtainable results. They are based on the same framework: decomposition in two bands $I_{high}$ and $I_{low}$ using 5D bilateral filtering, followed by a clipping of the low-pass band $I_{low}$ into $I_{lowM}$ and a locally adaptive scaling of $I_{high}$ into $I_{highM}$. Then $I_{highM}$ and $L_{lowM}$ are merged and adaptively mapped by using a local adaptive implementation of the two families of pointwise GMAs: compression and clipping.

Spatial and Color Adaptive Compression (SCACOMP)

Figure 6:
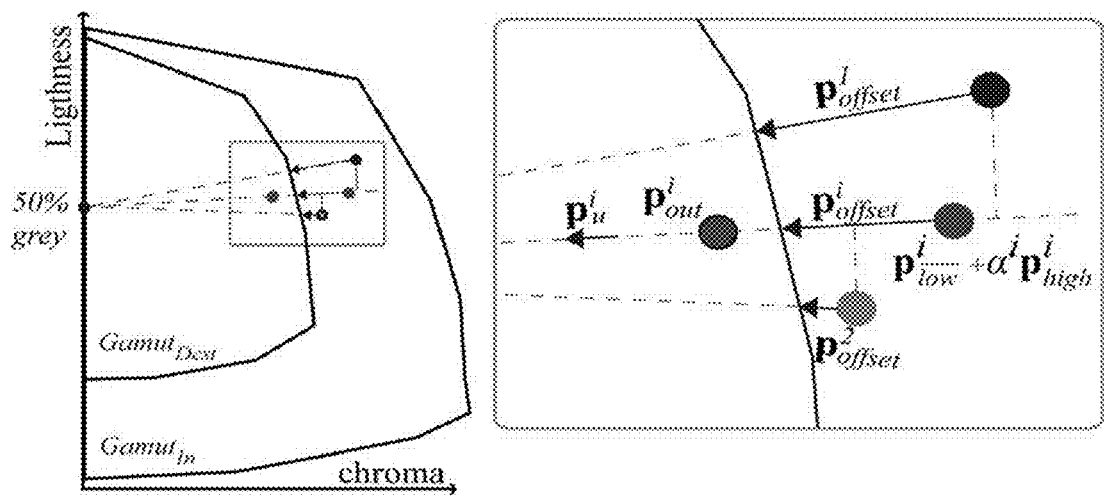
FIG. 6 shows SCACOMP, an illustration of mapping according to a first embodiment, where $p^1_{offset}$ (j=1) contributes to the shifting of $(p^i_{low}+a^i p^i_{high})$ toward the 0 grey point, unlike $p^2_{offset}$ (j=2)

According to a particular embodiment an adaptive compression algorithm to preserve the color variations between neighboring pixels contained by $I_{highM}$ is used. The concept is to project each pixel lying outside GamutDest toward the center, more or less deeply inside the gamut depending on its neighbors (FIG. 6).

First, $I_{highM}$ is added to $I_{lowM}$ and the sum $I_{temp}$ is mapped using SCLIP:

$$I_S = SCLIP(I_{temp}) = SCLIP(I_{lowM} + I_{highM}).$$

Then we compute the difference Ioffset between $I_S$ and the newly constructed image $I_{temp} = (I_{lowM} + I_{highM})$:

$$I_{offset} = I_S - I_{temp} = I_S - (I_{lowM} + I_{highM}).$$

At the given spatial position $x^i$, for each pixel j in the neighborhood, we project the color vector $p^j_{offset}$ on the direction of $p^i_{offset}$. If the result is greater than the norm $\|p^i_{offset}\|$, $p^j$ is taken into account and pushes $p^i_s \in I_s$ toward the 50% grey point of GamutDest (FIG. 6). Each neighbor's contribution to the shifting of pixel i is weighted by $w^j_{BF}$ defined by the Bilateral Filter BF:

$$w^j_{BF} = \frac{r(x^i, x^j)s(p^i, p^j)}{\sum_{j \in I_{in}}(r(x^i, x^j)s(p^i, p^j))},$$

and $$p^i_{out} = \left(p^i_{\overline{low}} + p^i_{\overline{high}}\right) + w^i_{shift} p^i_{offset},$$

where:

$$w^i_{shift} = \sum_{j \in I_{in}} w^j_{BF} \max\left(\frac{p^j_{offset} \cdot p^i_{offset}}{\|p^i_{offset}\|^2}, 1\right),$$

where "•" denotes the scalar product. $w^i_{shift}$ is superior or equal to 1, guaranteeing therefore that the resulting color value lies in the gamut, between the gamut boundary and the 50% grey point of $Gamut_{Dest}$.

In a variant of the embodiment of SCACOMP each neighbor's contribution is controlled by $w^i_{shift}$:

$$p^i_{out} = SCLIP(p^i_{\overline{low}} + \alpha^i p^i_{high}) + w^i_{shift} p^i_u,$$

where $p^i_u$ is the unit vector toward 50% grey, $$w^i_{shift} = \sum_{j \in I_{in}} w^j_{BF} \max(p^j_{offset} \cdot p^i_u - |p^i_{offset}|, 0),$$

$$p^i_{offset} = SCLIP(p^i_{\overline{low}} + p^i_{\overline{high}}) - (p^i_{\overline{low}} + p^i_{\overline{high}}),$$

and where "•" denotes the scalar product.

As $w^i_{shift} \geq 0$, the resulting color value lies in the gamut, between the gamut boundary and the 50% grey point of GamutDest. This variant prevents numerical imprecisions which could arise with very small values of $|p_{offset}|$.

Spatial and Color Adaptive Clipping (SCACLIP)

According to a second embodiment, in order to maintain the content of $I_{high}$, the direction of the projection is set as a variable: for each pixel the optimal mapping direction will be chosen so that the local variations are best maintained.

Figure 7:
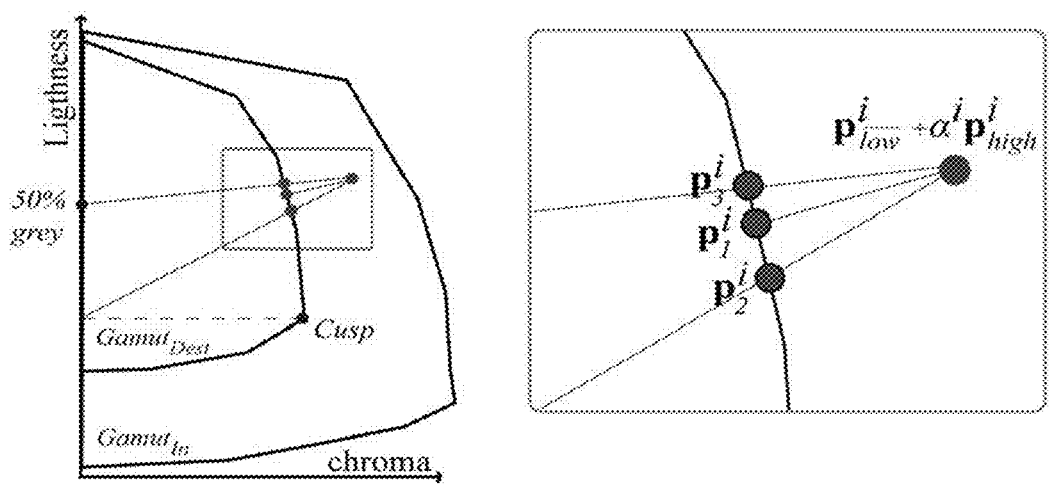
FIG. 7 shows SCACLIP, an illustration of mapping according to a second embodiment, where $(p^i_{low}+a^i p^i_{high})$ is mapped toward 3 directions, the optimal direction will be chosen so that the local variations are best maintained.

To get faster results, the choice is restricted to a set of directions. In the proposed second embodiment, the mapping direction will be chosen within directions known in the art, i.e. between $f_1$=HPMinΔE, $f_2$=CUSP and $f_3$=SCLIP. First, $I_{highM}$ is added to $I_{lowM}$ and the 3 mappings $f_n$, $n \in \{1, 2, 3\}$, are run (see FIG. 7). Then for each mapping the difference $I_{high\_nM}$ between the result of the mapping and $I_{lowM}$ is computed. This difference can be regarded as the result of the mapping of $I_{highM}$:

$$I_{high\_nM} = f_n(I_{lowM} + I_{highM}) - I_{lowM}, n \in \{1, 2, 3\}.$$

In $I_{high}$ we compute the energy $E^i_{high}$ corresponding to the weighted sum of the norms of $p^j_{high}$ for pixels j in the neighborhood of the pixel i, and similarly the energy $E^i_n$ in each $I_{high\_n}$:

$$E^i_{high} = \sum_{j \in I_{in}} w^j_{BF} \|p^j_{high}\|,$$

$$E^i_n = \sum_{j \in I_{in}} w^j_{BF} \|p^j_E\|,$$

where $w^j_{BF}$ are the weights of the bilateral filter used in the decomposition of the image.

Because the process is scanning the image pixel by pixel, some pixels $p^j_{out}$ of the neighborhood have been already processed. For these pixels, $p^j_{high\_nm}$ are replaced by results $p^j_{out}$ in the computation of $E^i_n$:

$$p^j_E = \begin{cases} p^j_{high\_n} & \text{for unprocessed pixels,} \\ p^j_{out} & \text{otherwise.} \end{cases}$$

Therefore, anterior decisions are taken into account and Iout depends on the processing order of the pixels. Error diffusion halftoning algorithms have a similar approach. Other options involving optimization tools are possible.

Then the direction of projection for which $E^i_n$ is the closest to $E^i_{high}$ is selected for the pixel i:

$$p^i_{out} = f_{select}(p^i_{low} + p^i_{high}),$$

$$select = \operatorname{argmin}_n(|E^i_n - E^i_{high}|), n \in \{1, 2, 3\}.$$

Modified Energy Minimization in SCACLIP

In a variant of the above embodiment, SCACLIP is further optimized by changing the mathematical expression of the energy to preserve.

$I_{highM}$ and $I_{lowM}$ are merged and the 3 mappings $f_n$, $n \in \{1, 2, 3\}$, are run:

$$I_{fn} = f_n(I_{lowM} + I_{highM}), n \in \{1, 2, 3\}.$$

In this variant of SCACLIP, the energy is defined as follows:

$$E^i_n = \sum_{j \in I_{in}} w^j_{BF} \|(p^j_{fn} - p^j_{fn}) - \alpha^i \cdot (p^j_{in} - p^i_{in})\|.$$

We apply here the same reduction α to $I_{in}$ as defined before for $I_{high}$ to compensate for the possible reduction of local energy of $I_{lowM}$ compared to $I_{lowM}$. The main improvement in this new definition of the energy is that we take into account the direction of the local color variations within a neighborhood while the energy in the original second embodiment took only into account the amplitude of these variations.

Figure 8:
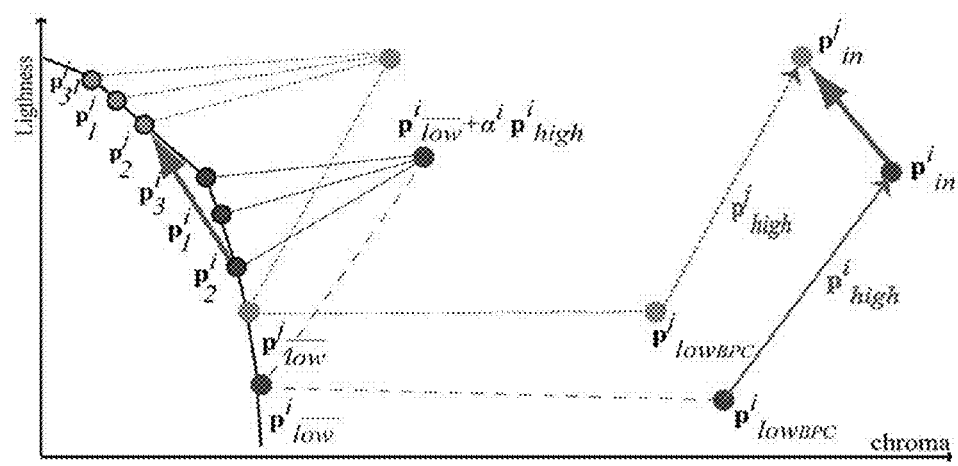
FIG. 8 shows modified SCACLIP, an improvement of a mapping, where the direction of each pixel is selected tp preserve as much as possible the vectors $p^i_{in}$ and $p^i_{in}$.

Then the direction of projection for which $E^i_n$ is the smallest is selected for the pixel i (see FIG. 8):

select=argmin$_n(E^i_n)$, $n \in \{1, 2, 3\}$, $p^i_{out} = f_{select}(p^i_{lowM} + p^i_{highM})$.

The proposed variant has as advantage that the local differences between the original image and the resulting image are better minimized.

In comparing the new SCAGMA's as proposed above with SCAGMAs known in the art, the following is noted:

In the system and method presented herein an edge-preserving filter to decompose the image is used. This filter allows to avoid halos. More particular a 5D Bilateral Filter is applied to $I_{in}$–GMA($I_{in}$) to form Ihigh which is then simply added to GMA($I_{in}$).

According to the proposed embodiment edge preserving multiscale decomposition with an adaptive adjustment of Ihigh obtained with function k( ) is used. This overcomes drawbacks of the prior art, such as:
(a) an adaptive adjustment in a Gaussian based multilevel decomposition would not avoid halos,
(b) an adjustment in the Zolliker and Simon SGMA would result in unbalanced frequency content in the image.

According to the proposed embodiment the method uses a locally adaptive function k( ) In the prior art only a function k( ) with constant scaling is known.

According to the proposed embodiment a locally adaptive mapping (SCACLIP) is provided which compares several mapping alternatives and minimizes the distortion of the local color differences within the input image through the computation of energies.

Advantage is that the frequency content in the resulting image is similar in image regions that are in the destination gamut Gamut$_{Dest}$ and those that are outside it. SGMAs known in the prior art fail on this.

Both embodiments SCACOMP and SCACLIP, presented above, are built on the same framework and therefore have a similar behavior. Yet some differences can be noticed between their output images. In the following we consider these differences, then compare the two algorithms with alternative existing GMAs. Tests have been carried out to evaluate the quality of the output images.

Images produced by SCACOMP are perceived as slightly less saturated and less sharp than SCACLIP but are more likely to be free of artifacts. The differences between the algorithms lead to the differences in the output images:

The initial mapping is different: HPMinΔE in SCACLIP versus SCLIP in SCA-COMP. This difference impacts perceived saturation of resulting images.

Ending adaptive mapping is different and the local contrast in SCACLIP output images is better preserved than in SCACOMP output images. Furthermore, SCACLIP is more likely to present local artifacts because of the limit to three possible directions. This limit can cause a sudden switch from one color to another in smoothly varying areas that might cause noticeable artifacts.

The difference between the resulting images is attenuated when BPC is applied prior to the mapping of $I_{low}$ in the workflow.

This concludes the explanation of step S7 of the method as presented in FIG. 2.

Finally in step S8 conversion takes place of $I_{out}$ to the CMYK encoding of the output printer using the relative colorometric intent of its ICC profile. The proposed gamut mapping algorithms are particularly useful for high quality rendering of images captured by a scanner or a digital camera.

Figure 9:
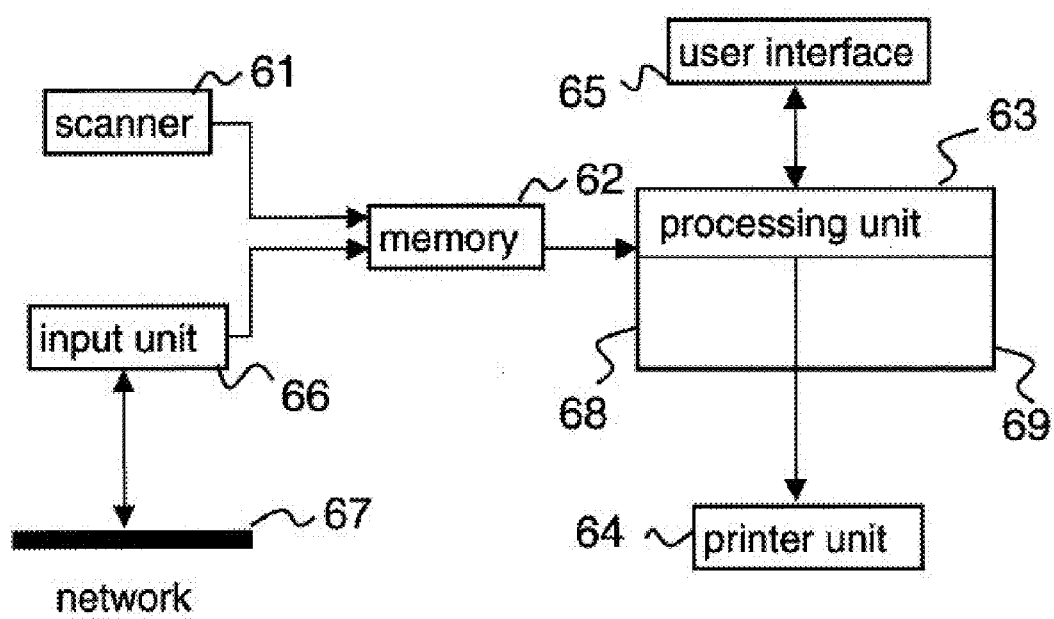
FIG. 9 is a simplified component diagram of a printing apparatus for use in connection with the invention.

FIG. 9 shows a diagrammatic representation of the most important parts of a digital printer in which the invention as described above is applied. This apparatus is provided with a user interface 65 and an input unit 66 for receiving digital images made elsewhere, e.g. via a network 67, so that the apparatus is used as a printer.

The apparatus is also provided with a scanner 61 having a device for transforming a recorded image (for example a photograph) to a digital image, a memory 62 for storing the digital image, a processing unit 63 for processing the digital image and a printing unit 64 for printing the processed digital image on paper or any suitable medium. The apparatus is also suited for use as a photocopier. For printing digital color images, the printing unit 64 contains a number of color printing sub-units, each printing a basis color. For example four color printing sub-units use the basis colorants cyan, yellow, magenta and black in the form of ink or toner. Colours are rendered with raster techniques such as dithering or error diffusion.

The input image originating from the scanner 61 or the input unit 66 is a color image of which the color values are to be transformed according to an embodiment of the invention. The input unit can be used to input image data of a photograph taken elsewhere by digital recording camera. To make a print, the processing unit 63 is provided with means to carry out the method according to the invention.

The processing unit 63 is connected to the operating unit 65, being a user interface. The operator interface 65 is provided with setting means for manually setting parameters of the gamut mapping function, for example by means of a slide or button.

When the invention is used in a printer in a network environment, the user can, for example, indicate by means of the printer driver at his workstation that a color image must be transformed according to his preferences and then printed taking into account desired values for the parameters. In that case, a processing device in the printer transforms the digital color image to a digital color image mapped on the destination gamut according to the invention, and prints the transformed image.

The transformed image may also be displayed on the display unit 68 for a visual control of the result of the transformation.

It is also possible to carry out steps of the gamut mapping method in a separate computer, for example the workstation of a user, and then send intermediate images to a printer, where additional steps for completing the mapping will be carried out, or to a mass memory for storage and later printing.

Figure 10:
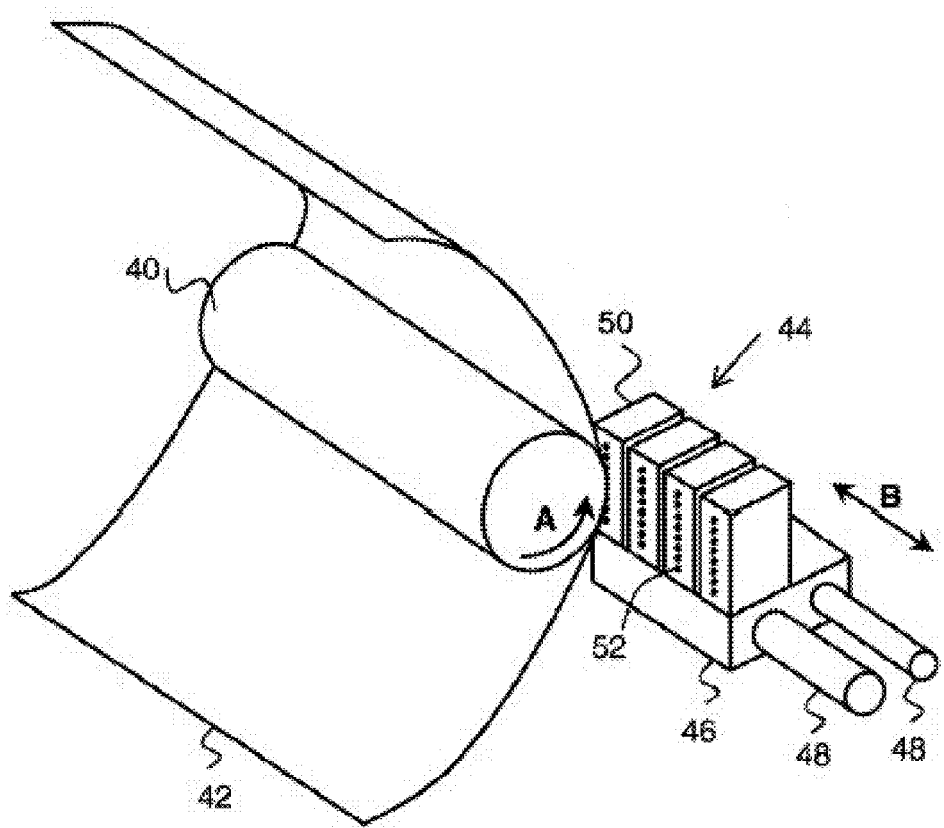
FIG. 10 is a diagram showing essential parts of an ink jet printer to which the invention is applicable.

Rendering the image can be performed in a printing apparatus as the one shown partly in FIG. 10. As is shown therein, an ink jet printer comprises a platen 40 driven for rotation in the direction of an arrow A for transporting a paper sheet 42 which serves as an image recording medium. A printhead 44 is mounted on a carriage 46 which is guided on guide rails 48 and travels back and forth in the direction of an arrow B along the platen 40 so as to scan the paper sheet 42. The printhead 44 comprises four nozzle heads 50, one for each of the basic colors yellow, magenta, cyan and black. An ink is supplied to a nozzle head 50 from an ink container (not shown) through a pipe. On the side facing the sheet 42, each nozzle head 50 has a linear array of nozzles 52. The nozzle heads 50 are energised in accordance with image information of an image to be printed on the sheet 42. Signals are transmitted to the printhead 44 through a connector (not shown) mounted on the carriage 46. Signals in accordance with print data arise from a control unit connected to the printhead 44 through a connector (not shown). Each nozzle 52 can be energised separately so as to eject an ink droplet which will form a dot at a corresponding pixel position on the sheet 42. Thus, when the printhead 44 performs a single stroke along the platen 40, each nozzle 52 can be energised to draw a single pixel line of the intended image. As a result, during each forward or backward stroke of the carriage 46, the printhead 44 will print a swath or band of the image, and the number of pixels lines of the swath will correspond to the number of nozzles 52 present in each nozzle array. Although only eight nozzles 52 are shown per nozzle head 50 in FIG. 10, in practice, the number of nozzles is considerably larger.

Transformation of the captured image data may be required to obtain images rendered with an enhanced colors quality.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for mapping an original image from a source gamut color subspace to a destination gamut color subspace, said method comprising the steps of:
    first filtering the original image to obtain a first intermediate image;
    gamut mapping the first intermediate image to obtain a second intermediate image;
    second filtering the first intermediate image to obtain a third intermediate image; and
    merging the second intermediate image and the third intermediate image to obtain a target image, where the merging step comprises merging the second intermediate image and the third intermediate image while preserving the color and spatial contents of the first intermediate image by moving pixels in the output gamut, based on certain criteria,
    wherein the gamut mapping of the first intermediate image is only applied to pixel that has an out-of-gamut color, and
    wherein the merging step comprises adaptive compression in order to fit all pixels in the gamut while preserving relationships between neighboring pixels or mapping pixels lying outside the gamut to the gamut boundary.

2. The method according to claim 1, wherein the second filtering step comprises the step of determining the difference between the original image and the first intermediate image in order to preserve high frequencies in the smoothly changing regions.

3. The method according to claim 1, wherein the first filtering step comprises using a bilateral filter for blurring smoothly changing regions of the original image with preservation of strong edges.

4. The method according to claim 1, wherein N–2 additional filtering steps are carried out to obtain N–2 additional filtered intermediate images and the merging step is additionally repeated N–2 times, each time merging the output of the previous merging step and the Nth filtered intermediate image.

5. A method for mapping an original image from a source gamut color subspace to a destination gamut color subspace, said method comprising the steps of:
    first filtering the original image to obtain a first intermediate image;
    gamut mapping the first intermediate image to obtain a second intermediate image;
    second filtering the first intermediate image to obtain a third intermediate image; and
    merging the second intermediate image and the third intermediate image to obtain a target image, where the first filtering step comprises using a bilateral filter for blurring smoothly changing regions of the original image with preservation of strong edges,
    wherein the gamut mapping of the first intermediate image is only applied to pixel that has an out-of-gamut color.

6. An image display system for rendering digital images in visible form by mapping an image from a source gamut color subspace to a destination gamut color subspace according to the method of claim 1.

7. A color image printing system for printing color images by mapping an image from a source gamut color subspace to a destination gamut color subspace according to the method of claim 1.

8. The color image printing system according to claim 7, embodied as an inkjet printing system.

9. A computer program embodied on a non-transitory computer readable medium for causing an apparatus to execute the method for mapping an original image from a source gamut color subspace to a destination gamut color subspace according to claim 1.

* * * * *